United States Patent
Tsai et al.

(10) Patent No.: US 12,338,374 B2
(45) Date of Patent: Jun. 24, 2025

(54) PRESSURE SENSITIVE ADHESIVE COMPOSITION AND PROTECTIVE FILM EMPLOYING THE SAME

(71) Applicant: TSRC CORPORATION, Kaohsiung (TW)

(72) Inventors: Wen-Pin Tsai, Kaohsiung (TW); Philip Chung-Ming Yang, Kaohsiung (TW); Hsi-Hsin Shih, Kaohsiung (TW)

(73) Assignee: TSRC CORPORATION, Kaohsiung (TW)

( * ) Notice: Subject to any disclaimer, the term of this patent is extended or adjusted under 35 U.S.C. 154(b) by 522 days.

(21) Appl. No.: 16/729,099

(22) Filed: Dec. 27, 2019

(65) Prior Publication Data

US 2020/0216726 A1   Jul. 9, 2020

Related U.S. Application Data

(60) Provisional application No. 62/788,210, filed on Jan. 4, 2019.

(51) Int. Cl.
*C09J 153/02* (2006.01)
*C08K 5/00* (2006.01)
(Continued)

(52) U.S. Cl.
CPC .......... *C09J 153/02* (2013.01); *C08K 5/0016* (2013.01); *C08K 5/01* (2013.01); *C08L 53/02* (2013.01);
(Continued)

(58) Field of Classification Search
None
See application file for complete search history.

(56) References Cited

U.S. PATENT DOCUMENTS 7,070,051 B2 *   7/2006   Kanner ............ A61B 17/06133
                                                                  206/460
2017/0002190 A1 *   1/2017   Hisasue .................. C08L 91/00
(Continued)

FOREIGN PATENT DOCUMENTS

CN         101657476 A      2/2010
TW         200728387 A      8/2007

OTHER PUBLICATIONS

Taiwanese Office Action and Search Report for Taiwanese Application No. 108148041 dated Aug. 5, 2020.

*Primary Examiner* — Frank D Ducheneaux
(74) *Attorney, Agent, or Firm* — Birch, Stewart, Kolasch & Birch, LLP

(57) ABSTRACT

A pressure sensitive adhesive composition and a protective film employing the same are provided. The pressure sensitive adhesive composition includes 30-45 parts by weight of a tackifier and 55-70 parts by weight of a polymer. The polymer includes at least one block copolymer. The block copolymer includes a vinyl aromatic block polymerized by a vinyl aromatic monomer and a conjugated diene block polymerized by a conjugated diene monomer. The block copolymer meets one of the following conditions: (1) the content of the vinyl aromatic monomer is from 15 wt % to 25 wt % and the content of the vinyl group of the conjugated diene block is less than or equal to 45 wt % or, (2) the content of the vinyl aromatic monomer is from 10 wt % to 15 wt % and the content of the vinyl group of the conjugated diene block is less than or equal to 45 wt %, or greater than or equal to 60 wt %.

19 Claims, 1 Drawing Sheet

(51) Int. Cl.
   *C08K 5/01*     (2006.01)
   *C08L 53/02*    (2006.01)
   *C09J 7/24*     (2018.01)
   *C09J 7/25*     (2018.01)
   *C09J 7/38*     (2018.01)
   *C09J 11/08*    (2006.01)
   *C09J 109/06*   (2006.01)
   *C09J 125/10*   (2006.01)

(52) U.S. Cl.
   CPC ............... *C09J 7/241* (2018.01); *C09J 7/25* (2018.01); *C09J 7/255* (2018.01); *C09J 7/387* (2018.01); *C09J 11/08* (2013.01); *C09J 109/06* (2013.01); *C09J 125/10* (2013.01); *C09J 153/025* (2013.01); *C08L 2205/025* (2013.01); *C08L 2205/03* (2013.01); *C09J 2301/408* (2020.08); *C09J 2423/006* (2013.01); *C09J 2423/04* (2013.01); *C09J 2423/10* (2013.01); *C09J 2425/00* (2013.01); *C09J 2433/006* (2013.01); *C09J 2467/006* (2013.01); *C09J 2469/006* (2013.01); *C09J 2475/006* (2013.01); *C09J 2477/006* (2013.01)

(56) References Cited

U.S. PATENT DOCUMENTS

2017/0101499 A1* 4/2017 Nakatani ............ C08F 297/044
2022/0049137 A1* 2/2022 Kameda ............ C09J 153/025

* cited by examiner

PRESSURE SENSITIVE ADHESIVE COMPOSITION AND PROTECTIVE FILM EMPLOYING THE SAME

CROSS REFERENCE TO RELATED APPLICATIONS

This application claims the benefit of U.S. Provisional Application No. 62/788,210, filed on Jan. 4, 2019, which is hereby incorporated herein by reference.

TECHNICAL FIELD

The disclosure relates to a pressure sensitive adhesive composition and a protective film employing the same.

BACKGROUND

Materials, such as metal plates, coated steel plates, synthetic resin plates and glass plates, often have a protective film coating their surface in order to protect the surface thereof. In general, such a protective film includes a substrate and an adhesive layer. This protective film can force a substrate to be adhered to a coating surface of a plate material via an adhesive layer, thereby suppressing damage to the material during a loading or transportation process, or to prevent degeneration or fading of the painting due to light, heat, or moisture.

Most current protective film is prepared using a solution coating process or a melting gel co-extrusion process (or called hot-melt co-extrusion process). However, when forming a laminate by the solution coating process, the use of large amount of solvent would cause environmental pollution problems. Further, the solution coating process should be repeated until the film has a sufficient thickness. Therefore, a novel adhesive composition, which exhibits characteristics of rubber, has a medium (or high) initial viscosity and is suitable to form a laminate by melting gel co-extrusion process, is desired.

SUMMARY

According to embodiments of the disclosure, the disclosure provides a pressure sensitive adhesive composition. The pressure sensitive adhesive composition can include 30-45 parts by weight of a tackifier and 55-70 parts by weight of a polymer. The polymer includes at least one block copolymer. The total weight of the tackifier and the polymer is 100 parts by weight. The block copolymer comprises a vinyl aromatic block polymerized by a vinyl aromatic monomer and a conjugated diene block polymerized by a conjugated diene monomer, and the block copolymer meets one of the following conditions: (1) the content of the vinyl aromatic monomer is from 15 wt % to 25 wt %, based on the total weight of the block copolymer, and the content of the vinyl group of the conjugated diene block is less than or equal to 45 wt %, based on the weight of the conjugated diene block; or, (2) the content of the vinyl aromatic monomer is from 10 wt % to 15 wt %, based on the total weight of the block copolymer, and the content of the vinyl group of the conjugated diene block is less than or equal to 45 wt %, or greater than or equal to 60 wt %, based on the weight of the conjugated diene block.

According to embodiments of the disclosure, the vinyl aromatic monomer is styrene, methylstyrene, ethylstyrene, t-butyl styrene, dimethylstyrene, methoxystyrene, cyclohexylstyrene, vinylbiphenyl, 1-vinyl-5-hexyl naphthalene, vinylnaphthalene, vinylanthracene, 2,4-diisopropylstyrene, 5-t-butyl-2-methylstyrene, divinylbenzene, trivinylbenzene, divinylnaphthalene, tert-butoxystyrene, 4-propyl styrene, 4-dodecylstyrene, 2-ethyl-4-benzyl styrene, 4-(phenylbutyl) styrene, N-(4-vinylbenzyl)-N,N-dimethylamine, 4-vinylbenzyl 2-(dimethylamino)ethyl ether, N,N-dimethylaminomethylstyrene, N,N-dimethylaminoethylstyrene, N,N-diethylaminomethylstyrene, N,N-diethylaminoethylstyrene, vinylxylene, vinylpyridine, diphenylethylene, 2,4,6-trimethylstyrene, α-methyl-2,6-dimethylstyrene, α-methyl-2,4-dimethylstyrene, β-methyl-2,6-dimethylstyrene, β-methyl-2,4-dimethylstyrene, indene, diphenylethylene containing tertiary amino groups, or a combination thereof.

According to embodiments of the disclosure, the conjugated diene monomer is 1,3-butadiene, 1,3-pentadiene, 1,3-hexadiene, 1,3-heptadiene, 2-methyl-1,3-butadiene(isoprene), 2-methyl-1,3-pentadiene, 2-hexyl-1,3-butadiene, 2-phenyl-1,3-butadiene, 2-phenyl-1,3-pentadiene, 2-p-tolyl-1,3-butadiene, 2-benzyl-1,3-butadiene, 3-methyl-1,3-pentadiene, 3-methyl-1,3-hexadiene, 3-butyl-1,3-octadiene, 3-phenyl-1,3-pentadiene, 4-methyl-1,3-pentadiene, 1,4-diphenyl-1,3-butadiene, 2,3-dimethyl-1,3-butadiene, 2,3-dimethyl-1,3-pentadiene, 2,3-dibenzyl-1,3-butadiene, 4,5-diethyl-1,3-octadiene, myrcene, or a combination thereof.

According to embodiments of the disclosure, the block copolymer is a hydrogenated block copolymer, the conjugated diene block has a hydrogenation rate greater than or equal to 90%.

According to embodiments of the disclosure, the block copolymer has a weight average molecular weight from 50,000 to 500,000.

According to embodiments of the disclosure, the tackifier is aliphatic hydrocarbon, cycloaliphatic hydrocarbon, aromatic hydrocarbon, modified hydrocarbon, aromatic modified aliphatic hydrocarbon, aromatic modified cycloaliphatic hydrocarbon, hydrogenated hydrocarbons, hydrogenated aliphatic hydrocarbon, hydrogenated cycloaliphatic hydrocarbon, hydrogenated aromatic modified aliphatic hydrocarbon, terpenes, modified terpenes, hydrogenated terpenes, rosins, gum rosins, hydrogenated rosins, rosin esters, hydrogenated rosin esters, chromane resins, phenolic resins, polyterpene resins, modified cycloaliphatic hydrocarbon, polymerized rosins, oligomer, or a combination thereof, wherein the monomer used for forming the oligomer can be ethylene, butene, styrene, or a combination thereof, and the oligomer has a weight average molecular weight less than 10,000.

According to embodiments of the disclosure, the content of the vinyl aromatic monomer of the block polymer is from 15 wt % to 25 wt %, based on the total weight of the block copolymer, and the content of the vinyl group of the conjugated diene block is from 30 wt % to 45 wt %, based on the weight of the conjugated diene block.

According to embodiments of the disclosure, the content of the vinyl aromatic monomer of the block polymer is from 10 wt % to 15 wt %, based on the total weight of the block copolymer, and the content of the vinyl group of the conjugated diene block is from 30 wt % to 45 wt % or from 60 wt % to 80 wt %, based on the weight of the conjugated diene block.

According to embodiments of the disclosure, the pressure sensitive adhesive composition includes the block copolymer meeting condition (1) and the block copolymer meeting condition (2) simultaneously.

According to embodiments of the disclosure, the weight ratio of the block copolymer meeting condition (1) to the block copolymer meeting condition (2) is from 1:1 to 1:50.

According to embodiments of the disclosure, the polymer further includes an olefin-based polymer, wherein the olefin-based polymer is olefin homopolymer, olefin copolymer, or a combination thereof, wherein the weight ratio of the olefin-based polymer to the block copolymer is from 6:7 to 1:100.

According to embodiments of the disclosure, the olefin homopolymer is ethylene homopolymer, propylene homopolymer, butylene homopolymer, or a combination thereof.

According to embodiments of the disclosure, the olefin copolymer is ethylene-vinyl acetate copolymer (EVA), ethylene-butyl acrylate copolymer (EBA), ethylene-ethyl acrylate copolymer (EEA), ethylene-methyl acrylate copolymer (EMA), ethylene-acrylate, ethylene-acrylic acid ionomer, ethylene-norbornene copolymer, ethylene-alpha-olefin copolymer, propylene-alpha-olefin copolymer, ethylene-propylene-alpha-olefin trimer, or a combination thereof.

According to embodiments of the disclosure, the pressure sensitive adhesive composition does not include olefin-based polymer.

According to embodiments of the disclosure, the pressure sensitive adhesive composition does not include process oil.

According to embodiments of the disclosure, the process oil is naphthenic oil, paraffin oil, aromatic oil, or natural oil.

According to embodiments of the disclosure, the pressure sensitive adhesive composition further includes 0.01-30 parts by weight of an additive, wherein the additive includes crosslinking agent, blowing agent, plasticizer, melt strength enhancer, antioxidant, antistick agent, antistatic agent, or a combination thereof.

According to some embodiments of the disclosure, the block copolymer is styrene-ethylene-butylene-styrene block copolymer (SEBS), styrene-butadiene-styrene block copolymer (SBS), styrene-isoprene-styrene block copolymer (SIS), styrene-ethylene-propylene-styrene block copolymer (SEPS), styrene-ethylene-(ethylene-propylene)-styrene block copolymer (SEEPS), styrene-isoprene/butadiene-styrene block copolymer (SIBS), styrene-butadiene block copolymer (SB), styrene-isoprene block copolymer (SI), styrene-ethylene-butylene block copolymer (SEB), styrene-ethylene-propylene block copolymer (SEP) or a combination thereof.

According to some embodiments of the disclosure, the disclosure also provides a protective film. The protective film includes a substrate; and an adhesive layer, wherein the adhesive layer is disposed on the substrate. The adhesive layer includes the aforementioned pressure sensitive adhesive composition.

According to embodiments of the disclosure, a material of the substrate is polyolefin, olefin copolymer, polyamide, thermoplastic polyamide elastomer, thermoplastic polyester elastomer (TPEE), thermoplastic polyurethane elastomer (TPU), polyester, polyurethane, polyethylene terephthalate (PET), polybutylene terephthalate (PBT), polycarbonate (PC), poly(methyl methacrylate) (PMMA), or a combination thereof.

A detailed description is given in the following embodiments with reference to the accompanying drawings.

DETAILED DESCRIPTION

Figure 1:
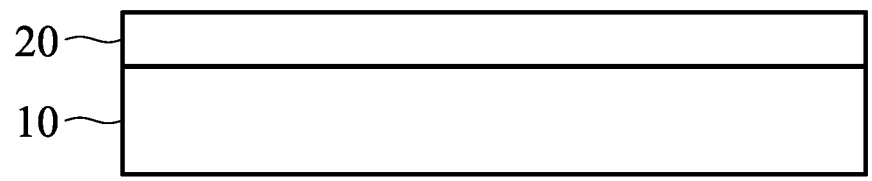
FIG. 1 is a schematic diagram showing the protective film according to an embodiment of the disclosure.

The pressure sensitive adhesive composition and the protective film employing the same are described in detail in the following description. In the following detailed description, for purposes of explanation, numerous specific details and embodiments are set forth in order to provide a thorough understanding of the present disclosure. The specific elements and configurations described in the following detailed description are set forth in order to clearly describe the present disclosure. It will be apparent, however, that the exemplary embodiments set forth herein are used merely for the purpose of illustration, and the inventive concept may be embodied in various forms without being limited to those exemplary embodiments.

The drawings described are only schematic and are non-limiting. In the drawings, the size, shape, or thickness of some of the elements may be exaggerated and not drawn on scale for illustrative purposes. The dimensions and the relative dimensions do not correspond to actual location to practice of the disclosure. The disclosure will be described with respect to particular embodiments and with reference to certain drawings but the disclosure is not limited thereto.

The disclosure provides a pressure sensitive adhesive composition. According to embodiments of the disclosure, due to the specific block copolymer and the specific ratio of the specific block copolymer to the tackifier, the pressure sensitive adhesive composition of the disclosure exhibits high initial viscosity. Therefore, the pressure sensitive adhesive composition is suitable to be used to form an adhesive layer via a co-extrusion molding process or a blown film process, and the adhesive layer and a substrate constitutes a protective film. In addition, the adhesive layer prepared from the pressure sensitive adhesive composition of the disclosure exhibits high peeling strength and high loop tack, and the adhesive layer can be disposed in close contact with the metal or plastic substrate.

According to embodiments of the disclosure, the pressure sensitive adhesive composition can include 30-45 parts by weight (such as 30-40 parts by weight, 35-45 parts by weight, or 35-40 parts by weight) of a tackifier, and 55-70 parts by weight (such as 60-70 parts by weight, 55-65 parts by weight, or 60-65 parts by weight) of a polymer. The polymer includes at least one block copolymer, wherein the total weight of the tackifier and the polymer is 100 parts by weight. According to embodiments of the disclosure, the block copolymer includes a vinyl aromatic block polymerized by a vinyl aromatic monomer and a conjugated diene block polymerized by a conjugated diene monomer, and the block copolymer meets one of the following conditions:

(1) the content of the vinyl aromatic monomer (i.e. the content of the moiety derived from the vinyl aromatic monomer) is from 15 wt % to 25 wt %, based on the total weight of the block copolymer, and the content of the vinyl group of the conjugated diene block is less than or equal to 45 wt %, based on the weight of the conjugated diene block; or, (2) the content of the vinyl aromatic monomer is from 10 wt % to 15 wt %, based on the total weight of the block copolymer, and the content of the vinyl group of the conjugated diene block is less than or equal to 45 wt %, or greater than or equal to 60 wt %, based on the weight of the conjugated diene block.

According to embodiments of the disclosure, the block copolymer is a hydrogenated block copolymer, which includes a vinyl aromatic block polymerized by a vinyl aromatic monomer and a conjugated diene block polymerized by a conjugated diene monomer. The block copolymer meets one of the following conditions:

(1) the content of the vinyl aromatic monomer is from 15 wt % to 25 wt %, based on the total weight of the block copolymer, and the content of the vinyl group of the conjugated diene block less than or equal to 45 wt % before hydrogenation, based on the weight of the conjugated diene block before hydrogenation; or (2) the content of the vinyl aromatic monomer is from 10 wt % to 15 wt %, based on the total weight of the block copolymer, and the content of the vinyl group of the conjugated diene block less than or equal to 45 wt %, or greater than or equal to 60 wt % before hydrogenation, based on the weight of the conjugated diene block before hydrogenation.

According to embodiments of the disclosure, the vinyl aromatic monomer can be styrene, methylstyrene (including 2-methylstyrene, or isomers thereof), ethylstyrene (including 2-ethylstyrene, or isomers thereof), tert-butyl styrene (including 2-tert-butyl styrene, or isomers thereof), dimethylstyrene (including 2,3-dimethylstyrene, or isomers thereof), methoxystyrene (including 2-methoxystyrene, or isomers thereof), cyclohexylstyrene (including 2-cyclohexylstyrene, or isomers thereof), vinylbiphenyl, 1-vinyl-5-hexylnaphthalene, vinylnaphthalene, vinylanthracene, 2,4-diisopropylstyrene, 5-tert-butyl-2-methylstyrene, divinylbenzene, trivinylbenzene, divinylnaphthalene, tert-butoxystyrene, 4-propyl styrene, 4-dodecylstyrene, 2-ethyl-4-benzyl styrene, 4-(phenylbutyl) styrene, N-(4-vinylbenzyl)-N,N-dimethylamine, 4-vinylbenzyl 2-(dimethylamino) ethyl ether, N,N-dimethylaminomethylstyrene, N,N-dimethylaminoethylstyrene, N,N-diethylaminomethylstyrene, N,N-diethylaminoethylstyrene, vinylxylene, vinylpyridine, diphenylethylene, 2,4,6-trimethylstyrene, α-methyl-2,6-dimethylstyrene, α-methyl-2,4-dimethylstyrene, β-methyl-2,6-dimethylstyrene, β-methyl-2,4-dimethylstyrene, indene, diphenylethylene containing tertiary amino groups (such as 1-(4-N,N-(dimethylamino)phenyl)-1-phenylethylene, or a combination thereof. Namely, the vinyl aromatic block can be prepared from the aforementioned monomer, or a combination of the aforementioned monomer via a polymerization.

According to embodiments of the disclosure, the conjugated diene monomer can be 1,3-butadiene, 1,3-pentadiene, 1,3-hexadiene, 1,3-heptadiene, 2-methyl-1,3-butadiene(isoprene), 2-methyl-1,3-pentadiene, 2-hexyl-1,3-butadiene, 2-phenyl-1,3-butadiene, 2-phenyl-1,3-pentadiene, 2-p-tolyl-1,3-butadiene, 2-benzyl-1,3-butadiene, 3-methyl-1,3-pentadiene, 3-methyl-1,3-hexadiene, 3-butyl-1,3-octadiene, 3-phenyl-1,3-pentadiene, 4-methyl-1,3-pentadiene, 1,4-diphenyl-1,3-butadiene, 2,3-dimethyl-1,3-butadiene, 2,3-dimethyl-1,3-pentadiene, 2,3-dibenzyl-1,3-butadiene, 4,5-diethyl-1,3-octadiene, myrcene, or a combination thereof. Namely, the conjugated diene block can be prepared from the aforementioned monomer, or a combination of the aforementioned monomer via a polymerization.

According to embodiments of the disclosure, the block copolymer can be styrene-ethylene-butylene-styrene block copolymer (SEBS), styrene-butadiene-styrene block copolymer (SBS), styrene-isoprene-styrene block copolymer (SIS), styrene-ethylene-propylene-styrene block copolymer (SEPS), styrene-ethylene-(ethylene-propylene)-styrene block copolymer (SEEPS), styrene-isoprene/butadiene-styrene block copolymer (SIBS), styrene-butadiene block copolymer (SB), styrene-isoprene block copolymer (SI), styrene-ethylene-butylene block copolymer (SEB), styrene-ethylene-propylene block copolymer (SEP) or a combination thereof.

According to embodiments of the disclosure, the block copolymer is a hydrogenated block copolymer, which includes a vinyl aromatic block polymerized by a vinyl aromatic monomer and a conjugated diene block polymerized by a conjugated diene monomer. According to embodiments of the disclosure, the hydrogenation rate of the conjugated diene block can be greater than or equal to 90%, such as greater than or equal to 95%, greater than or equal to 98%, or greater than or equal to 99%. According to embodiments of the disclosure, the hydrogenation rate of the vinyl aromatic block can be lower than 5%, or lower than 2%.

According to embodiments of the disclosure, the weight average molecular weight of the block copolymer can be from 50,000 to 500,000, such as from 50,000 to 400,000, from 50,000 to 300,000, from 80,000 to 500,000, from 80,000 to 120,000, from 80,000 to 150,000, from 80,000 to 200,000, from 80,000 to 250,000, from 150,000 to 200,000, or from 150,000 to 250,000.

According to embodiments of the disclosure, the tackifier used in the disclosure is not limited, can be a conventional tackifier which is used in the pressure sensitive adhesive composition. According to embodiments of the disclosure, the tackifier includes aliphatic hydrocarbon, cycloaliphatic hydrocarbon, aromatic hydrocarbon, modified hydrocarbon, aromatic modified aliphatic hydrocarbon, aromatic modified cycloaliphatic hydrocarbon, hydrogenated hydrocarbons, hydrogenated aliphatic hydrocarbon, hydrogenated cycloaliphatic hydrocarbon, hydrogenated aromatic modified aliphatic hydrocarbon, terpenes, modified terpenes, hydrogenated terpenes, rosins, gum rosins, hydrogenated rosins, rosin esters, hydrogenated rosin esters, chromane resins, phenolic resins, polyterpene resins, modified cycloaliphatic hydrocarbon, polymerized rosins, oligomer, or a combination thereof, wherein the oligomer is a compound which is polymerized by a lot of the same or different structural units (i.e. monomers). The oligomer has a weight average molecular weight less than 10,000. According to some embodiments of the disclosure, the monomer used for forming the oligomer can be ethylene, butene, styrene, or a combination thereof.

According to embodiments of the disclosure, the tackifier can be used to adjust the adhesiveness of the pressure sensitive adhesive composition. However, when the pressure sensitive adhesive composition of the disclosure has excessive amount of the tackifier, the pressure sensitive adhesive composition would have low cohesive strength, thereby reducing the adhesiveness thereof.

According to embodiments of the disclosure, the block copolymer meets the aforementioned condition (1). For example, the content of the vinyl aromatic monomer of the block copolymer meeting the aforementioned condition (1) can be from 15 wt % to 25 wt % (such as 15 wt %, 16 wt %, 17 wt %, 18 wt %, 19 wt %, 20 wt %, 21 wt %, 22 wt %, 23 wt %, 24 wt %, or 25 wt %), based on the total weight of the block copolymer. According to some embodiments of the disclosure, the content of the vinyl aromatic monomer can be from 15 wt % to 20 wt %. In addition, the content of the vinyl group of the conjugated diene block can be from 30 wt % to 45 wt % (such as 30 wt %, 31 wt %, 32 wt %, 33 wt %, 34 wt %, 35 wt %, 36 wt %, 37 wt %, 38 wt %, 39 wt %, 40 wt %, 41 wt %, 42 wt %, 43 wt %, 44 wt %, or 45 wt %) before hydrogenation, based on the weight of the conjugated diene block before hydrogenation. According to some embodiments of the disclosure, the content of the vinyl group of the conjugated diene block can be from 36 wt % to 42 wt % before hydrogenation.

According to embodiments of the disclosure, the block copolymer meets the aforementioned condition (2). For example, the content of the vinyl aromatic monomer of the block copolymer meeting the aforementioned condition (2) can be from 10 wt % to 15 wt % (such as 10 wt %, 11 wt %, 12 wt %, 13 wt %, 14 wt %, or 15 wt %), based on the total weight of the block copolymer. In addition, the content of the vinyl group of the conjugated diene block can be from 30 wt % to 45 wt % (such as 30 wt %, 31 wt %, 32 wt %, 33 wt %, 34 wt %, 35 wt %, 36 wt %, 37 wt %, 38 wt %, 39 wt %, 40 wt %, 41 wt %, 42 wt %, 43 wt %, 44 wt %, or 45 wt %), or 60 wt % to 80 wt % (such as 60 wt %, 61 wt %, 62 wt %, 63 wt %, 64 wt %, 65 wt %, 66 wt %, 67 wt %, 68 wt %, 69 wt %, 70 wt %, 71 wt %, 72 wt %, 73 wt %, 74 wt %, 75 wt %, 76 wt %, 77 wt %, 78 wt %, 79 wt %, or 80 wt %) before hydrogenation, based on the weight of the conjugated diene block before hydrogenation. According to some embodiments of the disclosure, the content of the vinyl aromatic monomer of the block copolymer meeting the aforementioned condition (2) can be from 10 wt % to 13 wt % (such as 10 wt %, 11 wt %, 12 wt %, or 13 wt %), based on the total weight of the block copolymer. In addition, the content of the vinyl group of the conjugated diene block can be from 35 wt % to 40 wt % (such as 35 wt %, 36 wt %, 37 wt %, 38 wt %, 39 wt %, or 40 wt %), or 70 wt % to 80 wt % (such as 70 wt %, 71 wt %, 72 wt %, 73 wt %, 74 wt %, 75 wt %, 76 wt %, 77 wt %, 78 wt %, 79 wt %, or 80 wt %) before hydrogenation, based on the weight of the conjugated diene block before hydrogenation. According to some embodiments of the disclosure, the content of the vinyl group of the conjugated diene block can be 75 wt % to 80 wt % before hydrogenation, based on the weight of the conjugated diene block before hydrogenation.

According to embodiments of the disclosure, the pressure sensitive adhesive composition merely includes the block copolymer meeting condition (1). According to some embodiments of the disclosure, the pressure sensitive adhesive composition merely includes the block copolymer meeting condition (2). According to some embodiments of the disclosure, besides the block copolymer meeting condition (2), the pressure sensitive adhesive composition includes the block copolymer meeting condition (1).

According to other embodiments of the disclosure, the pressure sensitive adhesive composition includes the block copolymer meeting condition (1) and the block copolymer meeting condition (2) simultaneously. In order to force the pressure sensitive adhesive composition exhibiting great processability and adhesiveness simultaneously, the weight ratio of the block copolymer meeting condition (1) to the block copolymer meeting condition (2) can be from 1:1 to 1:50, such as from 1:2 to 1:50, from 1:2 to 1:40, from 1:3 to 1:40, from 1:2 to 1:30, from 1:2 to 1:20, from 1:2 to 1:12, or from 1:1 to 1:12. According to some embodiments of the disclosure, in order to further improve the adhesiveness of the pressure sensitive adhesive composition, the weight ratio of the block copolymer meeting condition (1) to the block copolymer meeting condition (2) can be from 1:1 to 1:12, such as 1:1, 1:2, 1:3, 1:4, 1:5, 1:6, 1:7, 1:8, 1:9, 1:10, 1:11, or 1:12.

According to embodiments of the disclosure, the polymer can further include an olefin-based polymer. According to embodiments of the disclosure, the weight ratio of the olefin-based polymer to the block copolymer can be from 6:7 to 1:100, such as 6:7, 6:8, 2:3, 3:5, 1:2, 2:5, 4:9, 1:3, 1:4, 1:5, 2:11, 1:6, 1:7, 1:8, 1:9, 1:10, 1:20, 1:50, or 1:100. According to some embodiments of the disclosure, the weight ratio of the olefin-based polymer to the block copolymer can be from 2:11 to 1:100, such as 2:11, 1:6, 1:7, 1:8, 1:9, 1:10, 1:20, 1:50, or 1:100.

According to embodiments of the disclosure, the olefin-based polymer can be olefin homopolymer, olefin copolymer, or a combination thereof. According to embodiments of the disclosure, the olefin homopolymer is ethylene homopolymer, propylene homopolymer, butylene homopolymer, or a combination thereof. In the case of ethylene homopolymer, the olefin-based polymer can include polyethylene (PE), high density polyethylene (HDPE), ultra-high molecular weight high density polyethylene, low density polyethylene (LDPE), linear low density polyethylene (LLDPE), or ultra-low density polyethylene. In the case of propylene homopolymer, the olefin-based polymer can include polypropylene (PP). According to embodiments of the disclosure, the olefin copolymer can be ethylene-vinyl acetate copolymer (EVA), ethylene-butyl acrylate copolymer (EBA), ethylene-ethyl acrylate copolymer (EEA), ethylene-methyl acrylate copolymer (EMA), ethylene-acrylate, ethylene-acrylic ionomer, ethylene-norbornene copolymer, ethylene-alpha-olefin copolymer, propylene-alpha-olefin copolymer, ethylene-propylene-alpha-olefin trimer, or a combination thereof. In the case of ethylene-alpha-olefin copolymer, the olefin-based polymer can include ethylene-propylene copolymer, ethylene-1-butene copolymer, ethylene-1-hexene copolymer, ethylene-1-heptene copolymer, ethylene-1-octene copolymer, ethylene-4-methyl-1-pentene copolymer, ethylene-1-nonene copolymer, ethylene-1-decene copolymer, chlorinated polyethylenepropylene-butylene copolymer, or modified derivatives thereof. In the case of propylene-alpha-olefin copolymer, the olefin-based polymer can include propylene-ethylene copolymer, propylene-1-butene copolymer, propylene-1-hexene copolymer, propylene-1-heptene copolymer, propylene-1-octene copolymer, propylene-4-methyl-1-pentene copolymer, propylene-1-nonene copolymer, propylene-1-decene copolymer, propylene-pentene random copolymer, propylene-ethylene-pentene random copolymer, or propylene-ethylene-hexene random copolymer.

According to some embodiments of the disclosure, in order to avoid reducing the adhesiveness of the pressure sensitive adhesive composition of the disclosure, the pressure sensitive adhesive composition of the disclosure does not include olefin-based polymer.

According to some embodiments of the disclosure, in order to enhance the processability, the pressure sensitive adhesive composition of the disclosure can further include 0.1-15 parts by weight (such as 0.1-5 parts by weight, 0.1-10 parts by weight, or 1-15 parts by weight) of a process oil. According to embodiments of the disclosure, the process oil can be naphthenic oil, paraffin oil, aromatic oil, or natural oil.

According to some embodiments of the disclosure, in order to avoid reducing the adhesiveness of the pressure sensitive adhesive composition of the disclosure, the pressure sensitive adhesive composition of the disclosure does not include process oil.

According to embodiments of the disclosure, in order to increase the applicability of the pressure sensitive adhesive composition or enhance the physical or chemical properties of the pressure sensitive adhesive composition, the pressure sensitive adhesive composition of the disclosure can further include 0.01-30 parts by weight (such as 0.01-25 parts by weight, 0.1-30 parts by weight, 0.1-20 parts by weight, or 1-25 parts by weight) of an additive. According to embodiments of the disclosure, the additive can include crosslinking agent, blowing agent, plasticizer, melt strength enhancer, antioxidant, antistick agent, antistatic agent, or a combination thereof.

According to embodiments of the disclosure, the disclosure also provides a protective film. As shown in FIG. 1, the protective film 100 include a substrate 10 and an adhesive layer 20 disposed on the substrate 10. In particularly, the adhesive layer includes the pressure sensitive adhesive composition of the disclosure. According to embodiments of the disclosure, the thickness of the adhesive layer is not limited and can be optionally modified by a person of ordinary skill in the field. For example, the thickness of the adhesive layer can be from about 1 μm to 100 μm, such as 1 μm, 10 μm, 20 μm, 50 μm, or 100 μm.

According to embodiments of the disclosure, materials of the substrate can be any polymer material which is suitable to be formed a film via a co-extrusion molding process or a blown film process. Suitable materials of the substrate can be, for example, polyolefin, olefin copolymer, polyamide, thermoplastic polyamide elastomer, thermoplastic polyester elastomer (TPEE), thermoplastic polyurethane elastomer (TPU), polyester, polyurethane, polyethylene terephthalate (PET), polybutylene terephthalate (PBT), polycarbonate (PC), poly(methyl methacrylate) (PMMA), or a combination thereof. According to embodiments of the disclosure, the aforementioned polymer material can be used alone or in combination. Further, the substrate is fabricated by a lamination process (i.e. the substrate is a laminate). According to embodiments of the disclosure, the thickness of the substrate is not limited. For example, the thickness of the substrate can be from 10 μm to 1.0 mm.

According to embodiments of the disclosure, the pressure sensitive adhesive composition of the disclosure and a substrate composition (used for forming the substrate) can be used to form a protective film via a co-extrusion molding process or a blown film process. According to embodiments of the disclosure, the pressure sensitive adhesive composition of the disclosure can be subjected to a blending pelletization in advance, thereby obtaining masterbatches. For example, the blending of the pressure sensitive adhesive composition of the disclosure can be performed by a banbury mixer, opening mill, kneader or twin screw extruder. According to embodiments of the disclosure, after mixing the components of the pressure sensitive adhesive composition of the disclosure in a specific ratio, the mixture is feed into the twin screw extruder via a main inlet and then subjected to the blending pelletization, wherein the barrel temperature of the twin screw extruder can be from 160 to 220° C.

Below, exemplary embodiments will be described in detail with reference to the accompanying drawings so as to be easily realized by a person having ordinary knowledge in the art. The inventive concept may be embodied in various forms without being limited to the exemplary embodiments set forth herein. Descriptions of well-known parts are omitted for clarity, and like reference numerals refer to like elements throughout.

EXAMPLES

Table 1 lists the block copolymers involved in the examples and comparative examples of the disclosure.

TABLE 1

| Code | Ingredients | weight average molecular weight (Mw) | styrene monomer content (wt %) (based on the weight of the block copolymer) | vinyl group content (wt %) (based on the weight of the butadiene block) | hydrogenation rate of the butadiene block | hydrogenation rate of the styrene block |
|---|---|---|---|---|---|---|
| TS-04 | SEBS | 92,300 | 18.29 | 39.19 | >95% | <1% |
| TS-07 | SEBS | 186,600 | 12.55 | 76.68 | >95% | <1% |
| SEBS-6152 | SEBS | 77,200 | 30.49 | 37.97 | >95% | <1% |
| RD-SEBS | SEBS | 100,423 | 19.4 | 68.9 | >95% | <1% |

Table 2 lists the agents involved in the examples and comparative examples of the disclosure.

TABLE 2

| Product code | Category | Supplier | Ingredients |
|---|---|---|---|
| Regalite ®R1125 | tackifier | Eastman Chemical Company | hydrocarbon resin |
| Regalite ®R1100 | tackifier | Eastman Chemical Company | hydrocarbon resin |
| T-REZ HA103 | tackifier | JXTG | hydrocarbon resin |
| LTM 2119X | Olefin homopolymer | ASPC | low density polyethylene (PE) (melt flow index = 1.9 dg/min) (ISO 1133) |
| 150(II) | process oil | Ban Hon Specialty Oil CO, LTD | paraffin oil |

Example 1

70 parts by weight of TS-04 (block copolymer) and 30 parts by weight Regalite®R1125 (tackifier) were subjected to a blending process and a palletization via a twin screw extruder, wherein the barrel temperature was from about 160° C. to 220° C. Next, the obtained masterbatch was subjected to a thermocompression to form a film by a molding press (the thickness of film was set in a range of 0.17 mm to 0.24 mm), wherein the thermocompression was performed at about 200° C. for 4 minutes. Next, the obtained film was disposed on a release paper and then cut to form a test specimen (25.4 mm×127 mm). The test specimen was subjected to a loop tack test, and the results are shown in Table 3.

The loop tack test was performed according to ASTM D 6195-03 test method via an Instron tensile tester (5500R, Instron Corporation) to measure the force to separate the test specimen from a 306 stainless steel plate (i.e. debonding strength) in grams force (gf), and the unit of obtained value is in grams force per inch (gf/inch). For convenience of comparison, as shown in Table 3, the measured loop tack values were represented relatively to each other, wherein the loop tack value of the obtained film as disclosed in Example 1 was considered as 100%.

Example 2

Example 2 was performed in the same manner as in Example 1, except that the weight of TS-04 was reduced from 70 parts by weight to 65 parts by weight, and the weight for Regalite®R1125 was increased from 30 parts by weight to 35 parts by weight. Next, the obtained film was disposed on a release paper and then cut to form a test specimen (25.4 mm×127 mm). The test specimen was subjected to a loop tack test, and the results are shown in Table 3.

Example 3

Example 3 was performed in the same manner as in Example 1, except that the weight of TS-04 was reduced from 70 parts by weight to 62.5 parts by weight, and the weight for Regalite®R1125 was increased from 30 parts by weight to 37.5 parts by weight. Next, the obtained film was disposed on a release paper and then cut to form a test specimen (25.4 mm×127 mm). The test specimen was subjected to a loop tack test, and the results are shown in Table 3.

Example 4

Example 4 was performed in the same manner as in Example 1, except that the weight of TS-04 was reduced from 70 parts by weight to 60 parts by weight, and the weight for Regalite®R1125 was increased from 30 parts by weight to 40 parts by weight. Next, the obtained film was disposed on a release paper and then cut to form a test specimen (25.4 mm×127 mm). The test specimen was subjected to a loop tack test, and the results are shown in Table 3.

Example 5

Example 5 was performed in the same manner as in Example 1, except that the weight of TS-04 was reduced from 70 parts by weight to 55 parts by weight, and the weight for Regalite®R1125 was increased from 30 parts by weight to 45 parts by weight. Next, the obtained film was disposed on a release paper and then cut to form a test specimen (25.4 mm×127 mm). The test specimen was subjected to a loop tack test, and the results are shown in Table 3.

Comparative Example 1

Comparative Example 1 was performed in the same manner as in Example 1, except that the weight of TS-04 was increased from 70 parts by weight to 80 parts by weight, and the weight for Regalite®R1125 was reduced from 30 parts by weight to 20 parts by weight. Next, the obtained film was disposed on a release paper and then cut to form a test specimen (25.4 mm×127 mm). The test specimen was subjected to a loop tack test, and the results are shown in Table 3.

Comparative Example 2

Comparative Example 2 was performed in the same manner as in Example 1, except that the weight of TS-04 was increased from 70 parts by weight to 75 parts by weight, and the weight of Regalite®R1125 was reduced from 30 parts by weight to 25 parts by weight. Next, the obtained film was disposed on a release paper and then cut to form a test specimen (25.4 mm×127 mm). The test specimen was subjected to a loop tack test, and the results are shown in Table 3.

Comparative Example 3

Comparative Example 3 was performed in the same manner as in Example 1, except that the weight of TS-04 was reduced from 70 parts by weight to 50 parts by weight, and the weight for Regalite®R1125 was increased from 30 parts by weight to 50 parts by weight. Next, the obtained film was disposed on a release paper and then cut to form a test specimen (25.4 mm×127 mm). The test specimen was subjected to a loop tack test, and the results are shown in Table 3.

Comparative Example 4

Comparative Example 4 was performed in the same manner as in Example 1, except that the weight of TS-04 was reduced from 70 parts by weight to 45 parts by weight, and the weight for Regalite®R1125 was increased from 30 parts by weight to 55 parts by weight. Next, the obtained film was disposed on a release paper and then cut to form a test specimen (25.4 mm×127 mm). The test specimen was subjected to a loop tack test, and the results are shown in Table 3.

TABLE 3

|  | TS-04 (parts by weight) | Regalite ®R1125 (parts by weight) | loop tack relative value (%) |
| --- | --- | --- | --- |
| Comparative Example 1 | 80 | 20 | 63 |
| Comparative Example 2 | 75 | 25 | 82.6 |
| Example 1 | 70 | 30 | 100 |
| Example 2 | 65 | 35 | 127.4 |
| Example 3 | 62.5 | 37.5 | 150.0 |
| Example 4 | 60 | 40 | 111.7 |
| Example 5 | 55 | 45 | 101.7 |
| Comparative Example 3 | 50 | 50 | 91.3 |
| Comparative Example 4 | 45 | 55 | 87 |

As shown in Table 3, when the content of the vinyl aromatic monomer and the content of the vinyl group of the conjugated diene block of the block copolymer meets condition (1) of the disclosure and the amount of the tackifier was 30 wt % to 45 wt % based on the total weight of the block copolymer and the tackifier, the obtained film exhibits relatively high loop tack value. It should be noted that, as shown in Table 3, when the content of the vinyl aromatic monomer and the content of the vinyl group of the conjugated diene block of the block copolymer meets condition (1) of the disclosure, the loop tack value of the obtained film can be enhanced by increasing the amount of the tackifier. However, it can be obviously observed that the loop tack value of the film was reduced by increasing the amount of the tackifier, when the amount of the tackifier was greater than 37.5 parts by weight (i.e. 37.5 wt %, based on the total weight of the tackifier and the block copolymer). It means that the properties of the obtained film were deteriorated due to the excessive tackifier.

Example 6

55 parts by weight of TS-07 (block copolymer) and 45 parts by weight Regalite®R1125 (tackifier) were subjected to a blending process and a palletization via a twin screw extruder, wherein the barrel temperature was from about 160° C. to 220° C. Next, the obtained masterbatch was subjected to a thermocompression to form a film by a molding press (the thickness of film was set in a range of 0.17 mm to 0.24 mm), wherein the thermocompression was performed at about 200° C. for 4 minutes. Next, the obtained film was disposed on a release paper and then cut to form a test specimen (25.4 mm×127 mm). The test specimen was subjected to a loop tack test, and the results are shown in Table 4. For convenience of comparison, as shown in Table 4, the measured loop tack values were represented relatively to each other, wherein the loop tack value of the obtained film as disclosed in Example 6 was considered as 100%.

Example 7

Example 7 was performed in the same manner as in Example 6, except that the weight of TS-07 was increased from 55 parts by weight to 60 parts by weight, and the weight for Regalite®R1125 was reduced from 45 parts by weight to 40 parts by weight. Next, the obtained film was disposed on a release paper and then cut to form a test specimen (25.4 mm×127 mm). The test specimen was subjected to a loop tack test, and the results are shown in Table 4.

Example 8

Example 8 was performed in the same manner as in Example 6, except that the weight of TS-07 was increased from 55 parts by weight to 65 parts by weight, and the weight for Regalite®R1125 was reduced from 45 parts by weight to 35 parts by weight. Next, the obtained film was disposed on a release paper and then cut to form a test specimen (25.4 mm×127 mm). The test specimen was subjected to a loop tack test, and the results are shown in Table 4.

Example 9

Example 9 was performed in the same manner as in Example 6, except that the weight of TS-07 was increased from 55 parts by weight to 70 parts by weight, and the weight for Regalite®R1125 was reduced from 45 parts by weight to 30 parts by weight. Next, the obtained film was disposed on a release paper and then cut to form a test specimen (25.4 mm×127 mm). The test specimen was subjected to a loop tack test, and the results are shown in Table 4.

Comparative Example 5

Comparative Example 5 was performed in the same manner as in Example 6, except that the weight of TS-07 was reduced from 55 parts by weight to 45 parts by weight, and the weight for Regalite®R1125 was increased from 45 parts by weight to 55 parts by weight. Next, the obtained film was disposed on a release paper and then cut to form a test specimen (25.4 mm×127 mm). The test specimen was subjected to a loop tack test, and the results are shown in Table 4.

Comparative Example 6

Comparative Example 6 was performed in the same manner as in Example 6, except that the weight of TS-07 was increased from 55 parts by weight to 90 parts by weight, and the weight for Regalite®R1125 was reduced from 45 parts by weight to 10 parts by weight. Next, the obtained film was disposed on a release paper and then cut to form a test specimen (25.4 mm×127 mm). The test specimen was subjected to a loop tack test, and the results are shown in Table 4.

TABLE 4

|  | TS-07 (parts by weight) | Regalite ®R1125 (parts by weight) | loop tack relative value (%) |
|---|---|---|---|
| Comparative Example 5 | 45 | 55 | 29.7 |
| Example 6 | 55 | 45 | 100 |
| Example 7 | 60 | 40 | 108.1 |
| Example 8 | 65 | 35 | 166 |
| Example 9 | 70 | 30 | 159.2 |
| Comparative Example 6 | 90 | 10 | 57.4 |

As shown in Table 4, when the content of the vinyl aromatic monomer and the content of the vinyl group of the conjugated diene block of the block copolymer meets condition (2) of the disclosure and the amount of the tackifier was between 30 wt % and 45 wt % (especially between 30 wt % to 35 wt %) (based on the total weight of the block copolymer and the tackifier), the obtained film exhibits relatively high loop tack value. It should be noted that, as shown in Table 4, when the content of the vinyl aromatic monomer and the content of the vinyl group of the conjugated diene block of the block copolymer meets condition (2) of the disclosure, the loop tack value of the obtained film can be enhanced by increasing the amount of the tackifier. However, it can be obviously observed that the loop tack value of the obtained film was reduced by increasing the amount of the tackifier, when the amount of the tackifier was greater than 35 parts by weight (i.e. 35 wt %, based on the total weight of the tackifier and the block copolymer). It means that the properties of the obtained film were deteriorated due to the excessive tackifier.

Example 10

65 parts by weight of block copolymers (a mixture of TS-04 and TS-07, and the weight ratio of TS-04 to TS-07 was 1:1) and 35 parts by weight of Regalite®R1125 (tackifier) were subjected to a blending process and a palletization via a twin screw extruder, wherein the barrel temperature was from about 160° C. to 220° C. Next, the obtained masterbatch was subjected to a thermocompression to form a film by a molding press (the thickness of film was set in a range of 0.17 mm to 0.24 mm), wherein the thermocompression was performed at about 200° C. for 4 minutes. Next, the obtained film was disposed on a release paper and then cut to form a test specimen (25.4 mm×127 mm). The test specimen was subjected to a loop tack test, and the results are shown in Table 5. For convenience of comparison, as shown in Table 5, the measured loop tack values were represented relatively to each other, wherein the loop tack value of the obtained film as disclosed in Example 2 was considered as 100%.

Example 11

Example 11 was performed in the same manner as in Example 10, except that the weight ratio of TS-04 to TS-07 was adjusted from 1:1 to 1:2. Next, the obtained film was disposed on a release paper and then cut to form a test specimen (25.4 mm×127 mm). The test specimen was subjected to a loop tack test, and the results are shown in Table 5.

Example 12

Example 12 was performed in the same manner as in Example 10, except that the weight ratio of TS-04 to TS-07 was adjusted from 1:1 to 1:3.33. Next, the obtained film was disposed on a release paper and then cut to form a test specimen (25.4 mm×127 mm). The test specimen was subjected to a loop tack test, and the results are shown in Table 5.

Example 13

Example 13 was performed in the same manner as in Example 10, except that the weight ratio of TS-04 to TS-07 was adjusted from 1:1 to 1:12. Next, the obtained film was disposed on a release paper and then cut to form a test specimen (25.4 mm×127 mm). The test specimen was subjected to a loop tack test, and the results are shown in Table 5.

TABLE 5

| | TS-04:TS-07 | block copolymer (parts by weight) | Regalite ®R1125 (parts by weight) | loop tack relative value (%) |
|---|---|---|---|---|
| Example 2 | TS-04 only (in the absence of TS-07) | 65 | 35 | 100 |
| Example 10 | 1:1 | 65 | 35 | 137.2 |
| Example 11 | 1:2 | 65 | 35 | 283.3 |
| Example 12 | 1:3.33 | 65 | 35 | 200 |
| Example 13 | 1:12 | 65 | 35 | 228.7 |
| Example 8 | TS-07 only (in the absence of TS-04) | 65 | 35 | 251.5 |

As shown in Table 5, the loop tack value of the film prepared from the pressure sensitive adhesive composition of the disclosure can be adjusted by varying the weight ratio of the block copolymer meeting condition (1) to the block copolymer meeting condition (2). In comparison with the pressure sensitive adhesive composition which did not include the block polymer meeting condition (2) (i.e. Example 2), the obtained film exhibits relatively high loop tack value when the weight ratio of the block copolymer meeting condition (1) to the block copolymer meeting condition (2) was between 1:1 to 1:12. In addition, when the weight ratio of the block copolymer meeting condition (1) to the block copolymer meeting condition (2) was within the range of 1:2 to 1:12, the loop tack value of the film prepared from the pressure sensitive adhesive composition was enhanced significantly. In addition, when the weight ratio of the block copolymer meeting condition (1) to the block copolymer meeting condition (2) was within the range of 1:2 to 1:12, the obtained pressure sensitive adhesive composition also exhibits great processability. Therefore, the pressure sensitive adhesive composition is suitable to be formed a film via a co-extrusion molding process or a blown film process, and the obtained film can be disposed in close contact with the surface of the substrate.

Example 14

Example 14 was performed in the same manner as in Example 11, except that the weight of block copolymer was reduced from 65 parts by weight to 55 parts by weight, and the weight of the tackifier was increased from 35 parts by weight to 45 parts by weight. Next, the obtained film was disposed on a release paper and then cut to form a test specimen (25.4 mm×127 mm). The test specimen was subjected to a loop tack test, and the results are shown in Table 6. For convenience of comparison, as shown in Table 6, the measured loop tack values were represented relatively to each other, wherein the loop tack value of the obtained film as disclosed in Example 14 was considered as 100%.

Example 15

Example 15 was performed in the same manner as in Example 11, except that the weight of the block copolymer was increased from 65 parts by weight to 70 parts by weight, and the weight of tackifier was reduced from 35 parts by weight to 30 parts by weight. Next, the obtained film was disposed on a release paper and then cut to form a test specimen (25.4 mm×127 mm). The test specimen was subjected to a loop tack test, and the results are shown in Table 6.

Comparative Example 7

Comparative Example 7 was performed in the same manner as in Example 11, except that the weight of the block copolymer was reduced from 65 parts by weight to 45 parts by weight, and the weight of tackifier was increased from 35 parts by weight to 55 parts by weight. Next, the obtained film was disposed on a release paper and then cut to form a test specimen (25.4 mm×127 mm). The test specimen was subjected to a loop tack test, and the results are shown in Table 6.

Comparative Example 8

Comparative Example 8 was performed in the same manner as in Example 11, except that the weight of the block copolymer was increased from 65 parts by weight to 75 parts by weight, and the weight of tackifier was reduced from 35 parts by weight to 25 parts by weight. Next, the obtained film was disposed on a release paper and then cut to form a test specimen (25.4 mm×127 mm). The test specimen was subjected to a loop tack test, and the results are shown in Table 6.

TABLE 6

| | TS-04:TS-07 | block copolymer (parts by weight) | Regalite ®R1125 (parts by weight) | loop tack relative value (%) |
|---|---|---|---|---|
| Comparative Example 7 | 1:2 | 45 | 55 | 27.8 |

TABLE 6-continued

|  | TS-04:TS-07 | block copolymer (parts by weight) | Regalite ®R1125 (parts by weight) | loop tack relative value (%) |
|---|---|---|---|---|
| Example 14 | 1:2 | 55 | 45 | 100 |
| Example 11 | 1:2 | 65 | 35 | 197.6 |
| Example 15 | 1:2 | 70 | 30 | 124.5 |
| Comparative Example 8 | 1:2 | 75 | 25 | 83.3 |

As shown in Table 6, even if the block copolymers that meet the conditions (1) and (2) described in the disclosure are mixed and used under a specific ratio, as long as the amount of tackifier is maintained at 30 wt % to 45 wt %, the obtained film still exhibits relatively high loop tack value. It should be noted that, as shown in table 6, the loop tack value of the obtained film prepared from the pressure sensitive adhesive composition of the disclosure can be enhanced by increasing the amount of the tackifier. However, it can be obviously observed that the loop tack value of the film was reduced by increasing the amount of the tackifier, when the amount of the tackifier was greater than 35 parts by weight (i.e. 35 wt %, based on the total weight of the tackifier and the block copolymer). It means that the properties of the obtained film were deteriorated due to the excessive tackifier.

Example 16

65 parts by weight of TS-04 and LTM 2119X (the weight ratio of LTM 2119X to TS-04 was 6:7) and 35 parts by weight of Regalite®R1125 (tackifier) were subjected to a blending process and a palletization via a twin screw extruder, wherein the barrel temperature was from about 160° C. to 220° C. Next, the obtained masterbatch was subjected to a thermocompression to form a film by a molding press (the thickness of film was set in a range of 0.17 mm to 0.24 mm), wherein the thermocompression was performed at about 200° C. for 4 minutes. Next, the obtained film was disposed on a release paper and then cut to form a test specimen (25.4 mm×127 mm). The test specimen was subjected to a loop tack test, and the results are shown in Table 7. For convenience of comparison, as shown in Table 7, the measured loop tack values were represented relatively to each other, wherein the loop tack value of the obtained film as disclosed in Example 16 was considered as 100%.

Example 17

Example 17 was performed in the same manner as in Example 16, except that the weight ratio of LTM 2119X to TS-04 was adjusted from 6:7 to 4:9. Next, the obtained film was disposed on a release paper and then cut to form a test specimen (25.4 mm×127 mm). The test specimen was subjected to a loop tack test, and the results are shown in Table 7.

Example 18

Example 18 was performed in the same manner as in Example 16, except that the weight ratio of LTM 2119X to TS-04 was adjusted from 6:7 to 2:11. Next, the obtained film was disposed on a release paper and then cut to form a test specimen (25.4 mm×127 mm). The test specimen was subjected to a loop tack test, and the results are shown in Table 7.

Comparative Example 9

Comparative Example 9 was performed in the same manner as in Example 16, except that the weight ratio of LTM 2119X to TS-04 was adjusted from 6:7 to 8:5. Next, the obtained film was disposed on a release paper and then cut to form a test specimen (25.4 mm×127 mm). The test specimen was subjected to a loop tack test, and the results are shown in Table 7.

TABLE 7

|  | LTM 2119X:TS-04 | total weight of TS-04 and LTM 2119X (parts by weight) | Regalite ®R1125 (parts by weight) | loop tack relative value (%) |
|---|---|---|---|---|
| Comparative Example 9 | 8:5 | 65 | 35 | 84.9 |
| Example 16 | 6:7 | 65 | 35 | 100 |
| Example 17 | 4:9 | 65 | 35 | 131.9 |
| Example 18 | 2:11 | 65 | 35 | 171.6 |
| Example 2 | TS-04 only (in the absence of LTM 2119X) | 65 | 35 | 176.5 |

As shown in Table 7, when the weight ratio of the olefin-based polymer to the block copolymer is within a range of 6:7 to 2:11 (especially when the weight ratio of the olefin-based polymer to the block copolymer is within a range of 4:9 to 2:11) and the block copolymer of the pressure sensitive adhesive composition meets condition (1), the obtained film exhibits relatively high loop tack value. It should be noted that, as shown in Table 7, the loop tack value of the obtained film was deteriorated due to the addition of the olefin-based polymer in the composition. Therefore, according to some embodiments of the disclosure, the pressure sensitive adhesive composition of the disclosure does not include olefin-based polymer.

Example 19

65 parts by weight of TS-07 and LTM 2119X (the weight ratio of LTM 2119X to TS-07 was 6:7) and 35 parts by weight of Regalite®R1125 (tackifier) were subjected to a blending process and a palletization via a twin screw extruder, wherein the barrel temperature was from about 160° C. to 220° C. Next, the obtained masterbatch was subjected to a thermocompression to form a film by a molding press (the thickness of film was set in a range of 0.17 mm to 0.24 mm), wherein the thermocompression was performed at about 200° C. for 4 minutes. Next, the obtained film was disposed on a release paper and then cut to form a test specimen (25.4 mm×127 mm). The test specimen was subjected to a loop tack test, and the results are shown in Table 8. For convenience of comparison, as shown in Table 8, the measured loop tack values were represented relatively to each other, wherein the loop tack value of the obtained film as disclosed in Example 19 was considered as 100%.

Example 20

Example 20 was performed in the same manner as in Example 19, except that the weight ratio of LTM 2119X to TS-07 was adjusted from 6:7 to 4:9. Next, the obtained film was disposed on a release paper and then cut to form a test specimen (25.4 mm×127 mm). The test specimen was subjected to a loop tack test, and the results are shown in Table 8.

Example 21

Example 21 was performed in the same manner as in Example 19, the weight ratio of LTM 2119X to TS-07 was adjusted from 6:7 to 2:11. Next, the obtained film was disposed on a release paper and then cut to form a test specimen (25.4 mm×127 mm). The test specimen was subjected to a loop tack test, and the results are shown in Table 8.

Comparative Example 10

Comparative Example 10 was performed in the same manner as in Example 19, the weight ratio of LTM 2119X to TS-07 was adjusted from 6:7 to 8:5. Next, the obtained film was disposed on a release paper and then cut to form a test specimen (25.4 mm×127 mm). The test specimen was subjected to a loop tack test, and the results are shown in Table 8.

Example 22

65 parts by weight of block copolymers (including a mixture of TS-04 and TS-07, and the weight ratio of TS-04 to TS-07 was 1:2) and LTM 2119X (the weight ratio of LTM 2119X to the block copolymers was 6:7) and 35 parts by weight of Regalite®R1125 (tackifier) were subjected to a blending process and a palletization via a twin screw extruder, wherein the barrel temperature was from about 160° C. to 220° C. Next, the obtained masterbatch was subjected to a thermocompression to form a film by a molding press (the thickness of film was set in a range of 0.17 mm to 0.24 mm), wherein the thermocompression was performed at about 200° C. for 4 minutes. Next, the obtained film was disposed on a release paper and then cut to form a test specimen (25.4 mm×127 mm). The test specimen was subjected to a loop tack test, and the results are shown in Table 9. For convenience of comparison, as shown in Table 9, the measured loop tack values were represented relatively to each other, wherein the loop tack value of the obtained film as disclosed in Example 22 was considered as 100%.

Example 23

Example 23 was performed in the same manner as in Example 22, except that the weight ratio of LTM 2119X to the block copolymers was adjusted from 6:7 to 4:9. Next, the obtained film was disposed on a release paper and then cut to form a test specimen (25.4 mm×127 mm). The test specimen was subjected to a loop tack test, and the results are shown in Table 9.

Example 24

Example 24 was performed in the same manner as in Example 22, except that the weight ratio of LTM 2119X to the block copolymers was adjusted from 6:7 to 2:11. Next,

TABLE 8

| | LTM 2119X:TS-07 | total weight of TS-07 and LTM 2119X (parts by weight) | Regalite ®R1125 (parts by weight) | loop tack relative value (%) |
|---|---|---|---|---|
| Comparative Example 10 | 8:5 | 65 | 35 | 45 |
| Example 19 | 6:7 | 65 | 35 | 100 |
| Example 20 | 4:9 | 65 | 35 | 193.9 |
| Example 21 | 2:11 | 65 | 35 | 247 |
| Example 8 | TS-07 only (in the absence of LTM 2119X) | 65 | 35 | 279.1 |

As shown in Table 8, when the weight ratio of the olefin-based polymer to the block copolymer is within a range of 6:7 to 2:11 (especially the weight ratio of the olefin-based polymer to the block copolymer is within a range of 4:9 to 2:11) and the block copolymer of the pressure sensitive adhesive composition meets condition (2), the obtained film still exhibits relatively high loop tack value. It should be noted that, as shown in Table 8, the loop tack value of the obtained film was deteriorated due to the addition of the olefin-based polymer in the composition. Therefore, according to some embodiments of the disclosure, the pressure sensitive adhesive composition of the disclosure does not include olefin-based polymer.

the obtained film was disposed on a release paper and then cut to form a test specimen (25.4 mm×127 mm). The test specimen was subjected to a loop tack test, and the results are shown in Table 9.

Comparative Example 11

Comparative Example 11 was performed in the same manner as in Example 22, except that the weight ratio of LTM 2119X to the block copolymers was adjusted from 6:7 to 8:5. Next, the obtained film was disposed on a release paper and then cut to form a test specimen (25.4 mm×127 mm). The test specimen was subjected to a loop tack test, and the results are shown in Table 9.

TABLE 9

|  | LTM 2119X:block copolymer | total weight of block copolymer and LTM 2119X (parts by weight) | Regalite ®R1125 (parts by weight) | loop tack relative value (%) |
|---|---|---|---|---|
| Comparative Example 11 | 8:5 | 65 | 35 | 60.8 |
| Example 22 | 6:7 | 65 | 35 | 100 |
| Example 23 | 4:9 | 65 | 35 | 187.9 |
| Example 24 | 2:11 | 65 | 35 | 263.8 |
| Example 11 | block copolymer only (in the absence of LTM 2119X) | 65 | 35 | 715.5 |

As shown in Table 9, when the weight ratio of the olefin-based polymer to the block copolymers is within a range of 6:7 to 2:11 (especially when the weight ratio of the olefin-based polymer to the block copolymers is within a range of 4:9 to 2:11) in the pressure sensitive adhesive composition of the disclosure, the obtained film still exhibits relatively high loop tack value. It should be noted that, as shown in Table 9, the loop tack value of the obtained film was deteriorated due to the addition of the olefin-based polymer in the composition. Therefore, according to some embodiments of the disclosure, the pressure sensitive adhesive composition of the disclosure does not include olefin-based polymer.

Comparative Example 12

Comparative Example 12 was performed in the same manner as in Example 2, except that TS-04 was replaced with SEBS-6152. Next, the obtained film was disposed on a release paper and then cut to form a test specimen (25.4 mm×127 mm). The test specimen was subjected to a loop tack test, and the results are shown in Table 10. For convenience of comparison, as shown in Table 10, the measured loop tack values were represented relatively to each other, wherein the loop tack value of the obtained film as disclosed in Example 2 was considered as 100%.

TABLE 10

|  | block copolymer | block copolymer (parts by weight) | Regalite ®R1125 (parts by weight) | loop tack relative value (%) |
|---|---|---|---|---|
| Example 2 | TS-04 | 65 | 35 | 100 |
| Comparative Example 12 | SEBS-6152 | 65 | 35 | 67.2 |

SEBS-6152 and TS-04 are styrene-ethylene-butylene-styrene block copolymer (SEBS) and have similar molecular weight and content of the vinyl group of the conjugated diene block, but the content of vinyl aromatic monomer of SEBS-6152 was up to 30.49 wt % (exceeding the range of the content of vinyl aromatic monomer defined in the conditions (1) and (2) of the disclosure). Therefore, as shown in Table 10, the loop tack value of the obtained film prepared from the pressure sensitive adhesive composition, which included SEBS-6152 in substitution for TS-04, was relatively low (i.e. exhibiting low peeling strength), resulting in that the substrate of the protective film is apt to be separated from a plate which the protective film is attached thereon. Since TS-04 has relative low content of vinyl aromatic monomer and relative low hardness in comparison with SEBS-6152, the film prepared from the composition including the TS-04 is apt to be disposed in closer contact with a substrate. As a result, the pressure sensitive adhesive composition including SEBS-6152 is not suitable to serve as an adhesive layer of the protective film.

Comparative Example 13

Comparative Example 13 was performed in the same manner as in Example 2, except that TS-04 was replaced with RD-SEBS. Next, the obtained film was disposed on a release paper and then cut to form a test specimen (25.4 mm×127 mm). The test specimen was subjected to a loop tack test, and the results are shown in Table 11. For convenience of comparison, as shown in Table 11, the measured loop tack values were represented relatively to each other, wherein the loop tack value of the obtained film as disclosed in Comparative Example 13 was considered as 100%.

TABLE 11

|  | block copolymer | block copolymer (parts by weight) | Regalite ®R1125 (parts by weight) | loop tack relative value (%) |
|---|---|---|---|---|
| Example 8 | TS-07 | 65 | 35 | 120 |
| Example 11 | TS-04/TS-07 (TS-04:TS-07 = 1:2) | 65 | 35 | 135 |

TABLE 11-continued

|  | block copolymer | block copolymer (parts by weight) | Regalite ®R1125 (parts by weight) | loop tack relative value (%) |
|---|---|---|---|---|
| Example 13 | TS-04/TS-07 (TS-04:TS-07 = 1:12) | 65 | 35 | 109 |
| Comparative Example 13 | RD-SEBS | 65 | 35 | 100 |

RD-SEBS and TS-07 are styrene-ethylene-butylene-styrene block copolymer (SEBS), but the content of vinyl aromatic monomer of RD-SEBS was up to 19.4 wt % (exceeding the range of the content of vinyl aromatic monomer defined in the condition (2) of the disclosure). As shown in Table 11, in comparison with the film prepared from the pressure sensitive adhesive composition including RD-SEBS, the film prepared from the pressure sensitive adhesive composition including TS-07 (or the pressure sensitive adhesive composition including TS-07 and TS-04 (the weight ratio of TS-04 to TS-07 is between 1:2 to 1:12)) exhibits an improved loop tack value.

Comparative Example 14

65 parts by weight of TS-04 (block copolymer), 35 parts by weight of Regalite®R1125 (tackifier) and 5 parts by weight of paraffin oil (process oil) were subjected to a blending process and a palletization via a twin screw extruder, wherein the barrel temperature was from about 160° C. to 220° C. Next, the obtained masterbatch was subjected to a thermocompression to form a film by a molding press (the thickness of film was set in a range of 0.17 mm to 0.24 mm), wherein the thermocompression was performed at about 200° C. for 4 minutes. Next, the obtained film was disposed on a release paper and then cut to form a test specimen (25.4 mm×127 mm). The test specimen was subjected to a loop tack test, and the results are shown in Table 12. For convenience of comparison, as shown in Table 12, the measured loop tack values were represented relatively to each other, wherein the loop tack value of the obtained film as disclosed in Example 2 was considered as 100%.

TABLE 12

|  | paraffin oil (parts by weight) | TS-04 (parts by weight) | Regalite ®R1125 (parts by weight) | loop tack relative value (%) |
|---|---|---|---|---|
| Example 2 | 0 | 65 | 35 | 100 |
| Comparative Example 14 | 5 | 65 | 35 | 53.2 |

Comparative Example 15

65 parts by weight of TS-07 (block copolymer), 35 parts by weight of Regalite®R1125 (tackifier) and 5 parts by weight of paraffin oil (process oil) were subjected to a blending process and a palletization via a twin screw extruder, wherein the barrel temperature was from about 160° C. to 220° C. Next, the obtained masterbatch was subjected to a thermocompression to form a film by a molding press (the thickness of film was set in a range of 0.17 mm to 0.24 mm), wherein the thermocompression was performed at about 200° C. for 4 minutes. Next, the obtained film was disposed on a release paper and then cut to form a test specimen (25.4 mm×127 mm). The test specimen was subjected to a loop tack test, and the results are shown in Table 13. For convenience of comparison, as shown in Table 13, the measured loop tack values were represented relatively to each other, wherein the loop tack value of the obtained film as disclosed in Example 8 was considered as 100%.

TABLE 13

|  | paraffin oil (parts by weight) | TS-07 (parts by weight) | Regalite ®R1125 (parts by weight) | loop tack relative value (%) |
|---|---|---|---|---|
| Example 8 | 0 | 65 | 35 | 100 |
| Comparative Example 15 | 5 | 65 | 35 | 75.7 |

Comparative Example 16

65 parts by weight of block copolymers (a mixture of TS-04 and TS-07, and the weight ratio of TS-04 to TS-07 was 1:2), 35 parts by weight of Regalite®R1125 (tackifier) and 5 parts by weight of paraffin oil (process oil) were subjected to a blending process and a palletization via a twin screw extruder, wherein the barrel temperature was from about 160° C. to 220° C. Next, the obtained masterbatch was subjected to a thermocompression to form a film by a molding press (the thickness of film was set in a range of 0.17 mm to 0.24 mm), wherein the thermocompression was performed at about 200° C. for 4 minutes. Next, the obtained film was disposed on a release paper and then cut to form a test specimen (25.4 mm×127 mm). The test specimen was subjected to a loop tack test, and the results are shown in Table 14. For convenience of comparison, as shown in Table 14, the measured loop tack values were represented relatively to each other, wherein the loop tack value of the obtained film as disclosed in Example 11 was considered as 100%.

TABLE 14

|  | paraffin oil (parts by weight) | block copolymer (parts by weight) | Regalite ®R1125 (parts by weight) | loop tack relative value (%) |
|---|---|---|---|---|
| Example 11 | 0 | 65 | 35 | 100 |
| Comparative Example 16 | 5 | 65 | 35 | 70.6 |

As shown in Tables 12-14, in comparison with the pressure sensitive adhesive composition free of the process oil, the obtained film prepared from the pressure sensitive adhesive composition of the disclosure including process oil exhibits relatively low loop tack value. It means that the properties of the obtained adhesive layer were deteriorated due to the addition of the process oil. Therefore, according to some embodiments of the disclosure, the pressure sensitive adhesive composition of the disclosure does not include process oil.

Example 25

Example 25 was performed in the same manner as in Example 1, except that Regalite®R1125 was replaced with Regalite®R1100. Next, the obtained film was disposed on a release paper and then cut to form a test specimen (25.4 mm×127 mm). The test specimen was subjected to a loop tack test, and the results are shown in Table 15.

TABLE 15

| | tackifier | TS-04 (parts by weight) | tackifier (parts by weight) | loop tack relative value (%) |
|---|---|---|---|---|
| Example 1 | Regalite ® R1125 | 70 | 30 | 100 |
| Example 25 | Regalite ® R1100 | 70 | 30 | 133.4 |

It will be clear that various modifications and variations can be made to the disclosed methods and materials. It is intended that the specification and examples be considered as exemplary only, with the true scope of the disclosure being indicated by the following claims and their equivalents.

What is claimed is:

1. A pressure sensitive adhesive composition, comprising:
   30-45 parts by weight of a tackifier; and
   55-70 parts by weight of a polymer, wherein the polymer is a combination of a block copolymer meeting Condition (1) and a block copolymer meeting Condition (2),
   wherein the total weight of the tackifier and the polymer is 100 parts by weight,
   wherein the block copolymer meeting Condition (1) comprises a vinyl aromatic block polymerized by a vinyl aromatic monomer and a conjugated diene block polymerized by a conjugated diene monomer, and the content of the vinyl aromatic monomer is from 18.29 wt % to 25 wt %, based on the total weight of the block copolymer meeting Condition (1), and the content of the vinyl group of the conjugated diene block is less than or equal to 39.19 wt %, based on the weight of the conjugated diene block, and
   the block copolymer meeting Condition (2) comprises the vinyl aromatic block polymerized by the vinyl aromatic monomer and the conjugated diene block polymerized by the conjugated diene monomer, and the content of the vinyl aromatic monomer is from 10 wt % to 15 wt %, based on the total weight of the block copolymer meeting Condition (2), and the content of the vinyl group of the conjugated diene block is less than or equal to 38 wt %, or greater than or equal to 72 wt %, based on the weight of the conjugated diene block.

2. The pressure sensitive adhesive composition as claimed in claim 1, wherein the vinyl aromatic monomer is styrene, methylstyrene, ethylstyrene, tert-butyl styrene, dimethylstyrene, methoxystyrene, cyclohexylstyrene, vinylbiphenyl, 1-vinyl-5-hexylnaphthalene, vinylnaphthalene, vinylanthracene, 2,4-diisopropylstyrene, 5-tert-butyl-2-methylstyrene, divinylbenzene, trivinylbenzene, divinylnaphthalene, tert-butoxystyrene, 4-propyl styrene, 4-dodecylstyrene, 2-ethyl-4-benzyl styrene, 4-(phenylbutyl) styrene, N-(4-vinylbenzyl)-N,N-dimethylamine, 4-vinylbenzyl 2-(dimethylamino) ethyl ether, N,N-dimethylaminomethylstyrene, N,N-dimethylaminoethylstyrene, N,N-diethylaminomethylstyrene, N,N-diethylaminoethylstyrene, vinylxylene, vinylpyridine, diphenylethylene, 2,4,6-trimethylstyrene, α-methyl-2,6-dimethylstyrene, α-methyl-2,4-dimethylstyrene, β-methyl-2,6-dimethylstyrene, β-methyl-2,4-dimethylstyrene, indene, diphenylethylene containing tertiary amino groups, or a combination thereof.

3. The pressure sensitive adhesive composition as claimed in claim 1, wherein the conjugated diene monomer is 1,3-butadiene, 1,3-pentadiene, 1,3-hexadiene, 1,3-heptadiene, 2-methyl-1,3-butadiene (isoprene), 2-methyl-1,3-pentadiene, 2-hexyl-1,3-butadiene, 2-phenyl-1,3-butadiene, 2-phenyl-1,3-pentadiene, 2-p-tolyl-1,3-butadiene, 2-benzyl-1,3-butadiene, 3-methyl-1,3-pentadiene, 3-methyl-1,3-hexadiene, 3-butyl-1,3-octadiene, 3-phenyl-1,3-pentadiene, 4-methyl-1,3-pentadiene, 1,4-diphenyl-1,3-butadiene, 2,3-dimethyl-1,3-butadiene, 2,3-dimethyl-1,3-pentadiene, 2,3-dibenzyl-1,3-butadiene, 4,5-diethyl-1,3-octadiene, myrcene, or a combination thereof.

4. The pressure sensitive adhesive composition as claimed in claim 1, wherein the block copolymer meeting Condition (1) or the block copolymer meeting Condition (2) is a hydrogenated block copolymer, and the conjugated diene block has a hydrogenation rate greater than or equal to 90%.

5. The pressure sensitive adhesive composition as claimed in claim 1, wherein the block copolymer meeting Condition (1) or the block copolymer meeting Condition (2) has a weight average molecular weight from 50,000 to 500,000.

6. The pressure sensitive adhesive composition as claimed in claim 1, wherein the tackifier is aliphatic hydrocarbon, cycloaliphatic hydrocarbon, aromatic hydrocarbon, modified hydrocarbon, aromatic modified aliphatic hydrocarbon, aromatic modified cycloaliphatic hydrocarbon, hydrogenated hydrocarbons, hydrogenated aliphatic hydrocarbon, hydrogenated cycloaliphatic hydrocarbon, hydrogenated aromatic modified aliphatic hydrocarbon, terpenes, modified terpenes, hydrogenated terpenes, rosins, gum rosins, hydrogenated rosins, rosin esters, hydrogenated rosin esters, chromane resins, phenolic resins, polyterpene resins, modified cycloaliphatic hydrocarbon, polymerized rosins, oligomer, or a combination thereof, wherein the monomer used for forming the oligomer can be ethylene, butene, styrene, or a combination thereof, and the oligomer has a weight average molecular weight less than 10,000.

7. The pressure sensitive adhesive composition as claimed in claim 1, wherein the content of the vinyl aromatic monomer of the block copolymer meeting Condition (1) is from 18.29 wt % to 25 wt %, based on the total weight of the block copolymer meeting Condition (1), and the content of the vinyl group of the conjugated diene block is from 30 wt % to 39.19 wt %, based on the weight of the conjugated diene block.

8. The pressure sensitive adhesive composition as claimed in claim 1, wherein the content of the vinyl aromatic monomer of the block copolymer meeting Condition (2) is from 10 wt % to 15 wt %, based on the total weight of the block copolymer meeting Condition (2), and the content of the vinyl group of the conjugated diene block is from 30 wt % to 38 wt % or from 72 wt % to 80 wt %, based on the weight of the conjugated diene block.

9. The pressure sensitive adhesive composition as claimed in claim 1, wherein the weight ratio of the block copolymer meeting condition (1) to the block copolymer meeting condition (2) is from 1:1 to 1:50.

10. The pressure sensitive adhesive composition as claimed in claim 1, further comprising:
an olefin-based polymer, wherein the olefin-based polymer is olefin homopolymer, olefin copolymer, or a combination thereof.

11. The pressure sensitive adhesive composition as claimed in claim 10, wherein the olefin homopolymer is ethylene homopolymer, propylene homopolymer, butylene homopolymer, or a combination thereof.

12. The pressure sensitive adhesive composition as claimed in claim 10, wherein the olefin copolymer is ethylene-vinyl acetate copolymer (EVA), ethylene-butyl acrylate copolymer (EBA), ethylene-ethyl acrylate copolymer (EEA), ethylene-methyl acrylate copolymer (EMA), ethylene-acrylate, ethylene-acrylic acid ionomer, ethylene-norbornene copolymer, ethylene-alpha-olefin copolymer, propylene-alpha-olefin copolymer, ethylene-propylene-alpha-olefin trimer, or a combination thereof.

13. The pressure sensitive adhesive composition as claimed in claim 1, wherein the pressure sensitive adhesive composition does not include olefin-based polymer.

14. The pressure sensitive adhesive composition as claimed in claim 1, wherein the pressure sensitive adhesive composition does not include process oil.

15. The pressure sensitive adhesive composition as claimed in claim 14, wherein the process oil is naphthenic oil, paraffin oil, aromatic oil, or natural oil.

16. The pressure sensitive adhesive composition as claimed in claim 1, further comprising:
0.01-30 parts by weight of an additive, wherein the additive comprises crosslinking agent, blowing agent, plasticizer, melt strength enhancer, antioxidant, antistick agent, antistatic agent, or a combination thereof.

17. The pressure sensitive adhesive composition as claimed in claim 1, wherein the block copolymer meeting Condition (1) or the block copolymer meeting Condition (2) is styrene-ethylene-butylene-styrene block copolymer (SEBS), styrene-butadiene-styrene block copolymer (SBS), styrene-isoprene-styrene block copolymer (SIS), styrene-ethylene-propylene-styrene block copolymer (SEPS), styrene-ethylene-(ethylene-propylene)-styrene block copolymer (SEEPS), styrene-isoprene/butadiene-styrene block copolymer (SIBS), styrene-butadiene block copolymer (SB), styrene-isoprene block copolymer (SI), styrene-ethylene-butylene block copolymer (SEB), styrene-ethylene-propylene block copolymer (SEP) or a combination thereof.

18. A protective film, comprising:
a substrate; and
an adhesive layer disposed on the substrate,
wherein the adhesive layer comprises the pressure sensitive adhesive composition as claimed in claim 1.

19. The protective film as claimed in claim 18, wherein a material of the substrate is polyolefin, olefin copolymer, polyamide, thermoplastic polyamide elastomer, thermoplastic polyester elastomer, thermoplastic polyurethane elastomer, polyester, polyurethane, polyethylene terephthalate, polybutylene terephthalate, polycarbonate, poly(methyl methacrylate), or a combination thereof.

* * * * *